United States Patent
Jadav et al.

(12) 
(10) Patent No.: US 6,332,197 B1
(45) Date of Patent: Dec. 18, 2001

(54) SYSTEM FOR UPDATING DATA IN A MULTI-ADAPTOR ENVIRONMENT

(75) Inventors: Divyesh Jadav, Campbell; Deepak R. Kenchammana-Hosekote, Sunnyvale; Jaishankar Moothedath Menon, San Jose, all of CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/128,574

(22) Filed: Aug. 4, 1998

(51) Int. Cl.[7] .................................................. G06F 11/00

(52) U.S. Cl. ............................................... 714/6; 714/766

(58) Field of Search ................................. 711/155, 152, 711/156, 113, 114, 136; 714/5, 6, 7, 8, 763, 766

(56) References Cited

U.S. PATENT DOCUMENTS

| | | |
|---|---|---|
| 4,654,819 | 3/1987 | Stiffler et al. . |
| 4,733,352 | 3/1988 | Nakamura et al. . |
| 4,907,232 | 3/1990 | Harper et al. . |
| 4,916,605 | 4/1990 | Beardsley et al. . |
| 5,140,592 | 8/1992 | Idleman et al. . |
| 5,155,729 | 10/1992 | Rysko et al. . |
| 5,208,813 | 5/1993 | Stallmo . |
| 5,293,618 | 3/1994 | Tandai et al. . |
| 5,301,297 | 4/1994 | Menon et al. . |
| 5,373,512 | 12/1994 | Brady . |
| 5,375,128 * | 12/1994 | Menon et al. ........................ 714/763 |
| 5,437,022 | 7/1995 | Beardsley et al. . |
| 5,490,248 | 2/1996 | Dan et al. . |
| 5,499,337 | 3/1996 | Gordon . |
| 5,526,482 | 6/1996 | Stallmo et al. . |
| 5,530,830 | 6/1996 | Iwasaki et al. . |
| 5,530,948 | 6/1996 | Islam . |
| 5,546,535 | 8/1996 | Stallmo et al. . |
| 5,572,660 | 11/1996 | Jones . |

(List continued on next page.)

OTHER PUBLICATIONS

Cao, P. et al., "The TickerTAIP Parallel RAID Architecture", *ACM Transactions on Computer Systems*, vol. 12, No. 3, pp. 236–269 (Aug. 1994).

Chen, P. et al., "RAID: High–Performance, Reliable Secondary Storage", *ACM Computing Surveys*, vol. 26, No. 2, pp. 145–185 (Jun. 1994).

IBM Brochure, "SSA RAID Adapter for PC Servers", pp. 1–2, ® International Business Machines Corporation 1996.

(List continued on next page.)

*Primary Examiner*—James P. Trammell
*Assistant Examiner*—Pierre Eddy Elisca
(74) *Attorney, Agent, or Firm*—Merchant, Gould, Smith, Edell, Welter & Schmidt

(57) ABSTRACT

Disclosed is a system for updating and destaging data in a storage system. To overcome the limitations in the prior art described above, preferred embodiments of the present invention disclose a system for updating a data block in a storage device. A first processing unit receives an update to a data block in a storage device. The first processing unit sends a first message including the update and information indicating data blocks that were recently updated to a second processing unit. The second processing unit stores the update in a second storage area and sends a second message to the first processing unit after receiving the first message. The first processing unit stores the update in a first storage area and transfers the update from the first storage area to the data block in the storage device. The first processing unit transfers the update from the first storage area to the data block in the storage device. Data may be destaged from the first storage area by sending two messages before destage begins and two messages after destaging is completed so the second processing unit is aware of the state of the destaging operations.

26 Claims, 8 Drawing Sheets

U.S. PATENT DOCUMENTS

| | | |
|---|---|---|
| 5,574,863 | 11/1996 | Nelson et al. . |
| 5,574,882 | 11/1996 | Menon et al. . |
| 5,636,359 | 6/1997 | Beardsley et al. . |
| 5,640,530 | 6/1997 | Beardsley et al. . |
| 5,664,187 | 9/1997 | Burkes et al. . |
| 5,737,514 | 4/1998 | Stiffler . |
| 5,751,939 | 5/1998 | Stiffler . |
| 5,787,460 | 7/1998 | Yashiro et al. . |
| 5,809,224 | 9/1998 | Schultz et al. . |
| 5,813,016 | 9/1998 | Sumimoto . |
| 5,848,229 | 12/1998 | Morita . |
| 5,875,456 | 2/1999 | Stallmo et al. . |
| 5,913,227 | 6/1999 | Raz et al. . |
| 5,999,930 | 12/1999 | Wolff . |
| 6,073,218 | 6/2000 | DeKoning et al. . |

OTHER PUBLICATIONS

IBM Manual, "IBM PC ServeRAID Adapter—84H7117 Installation Instructions and User's Guide", 77 pages, First Edition (Jan. 1997).

IBM Brochure, "3527 SSA Storage Subsystem for PC Servers", pp. 1–2, © International Business Machines Corporation 1997.

IBM Brochure, "IBM PC ServeRAID Adds Two New Features", *IBM Personal computing solutions*, 12 pages (Dec. 16, 1997).

IBM Brochure, "IBM PC Server 704", *IBM Product Summaries, Personal Computing in Canada*, pp. 1–6, Last Published Jan. 16, 1998.

IBM Brochure, "SSA RAID Adapter for PCI", *IBM Storage*, pp. 1–5 (Jan. 16, 1998).

IBM Brochure, "Serial Storage Architecture (SSA)", *IBM Storage*, pp. 1–2 (Jan. 16, 1998).

IBM Spec Sheet, "PC Server Serial Storage Architecture (SSA) RAID Adapter Spec Sheet", *IBM Personal Computing*, Canada p. 1, Last Published Nov. 1, 1998.

Hewlett Packard Brochure, "Dynamic RAID Technology From Hewlett–Packard Addresses Issues in Current High Availability", *Hewlett Packard, Enterprise Storage Solutions Division*, pp. 1–6 (Revised Apr. 1997).

Hewlett Packard Brochure, "What are Disk Arrays?", *Information Storage*, pp. 1–11 (Jan. 15, 1998).

Judd, I., et al., "Serial Storage Architecture", *IBM Journal of Research & Development*, vol. 40, No. 6—Nontopical issue, pp. 1–14 (Jan. 16, 1998).

Menon, J. et al., "Algorithms for Software and Low–cost Hardware RAIDs", *IEEE*, pp. 411–418 (1995).

Menon, J., "Performance of RAIDS Disk Arrays with Read and Write Caching", *Distributed and Parallel Databases*, vol. 2, pp. 261–293 (1994).

Menon, J. et al., "The Architecture of a Fault—Tolerant Cached RAID Controller", *Computer Science, Research Report*, pp. 1–28 (Jan. 22,1993).

MYLEX Manual, "DAC960SX Family User Guide, Ultra–SCSI to Ultra–SCSI RAID Controllers DAC960SX and DAC960SXI", Manual Version 1.0, Part No. 771975–D01, *Mylex*, ©Copyright 1997 Mylex Corporation.

Patterson, D. et al., "A Case for Redundant Arrays of Inexpensive Disks (RAID)", *ACM*, pp. 109–116 (1988).

Riegel, J. et al. "Performance of Recovery Time Improvement Algorithms for Software RAIDs", *IEEE*, pp. 56–65 (1996).

\* cited by examiner

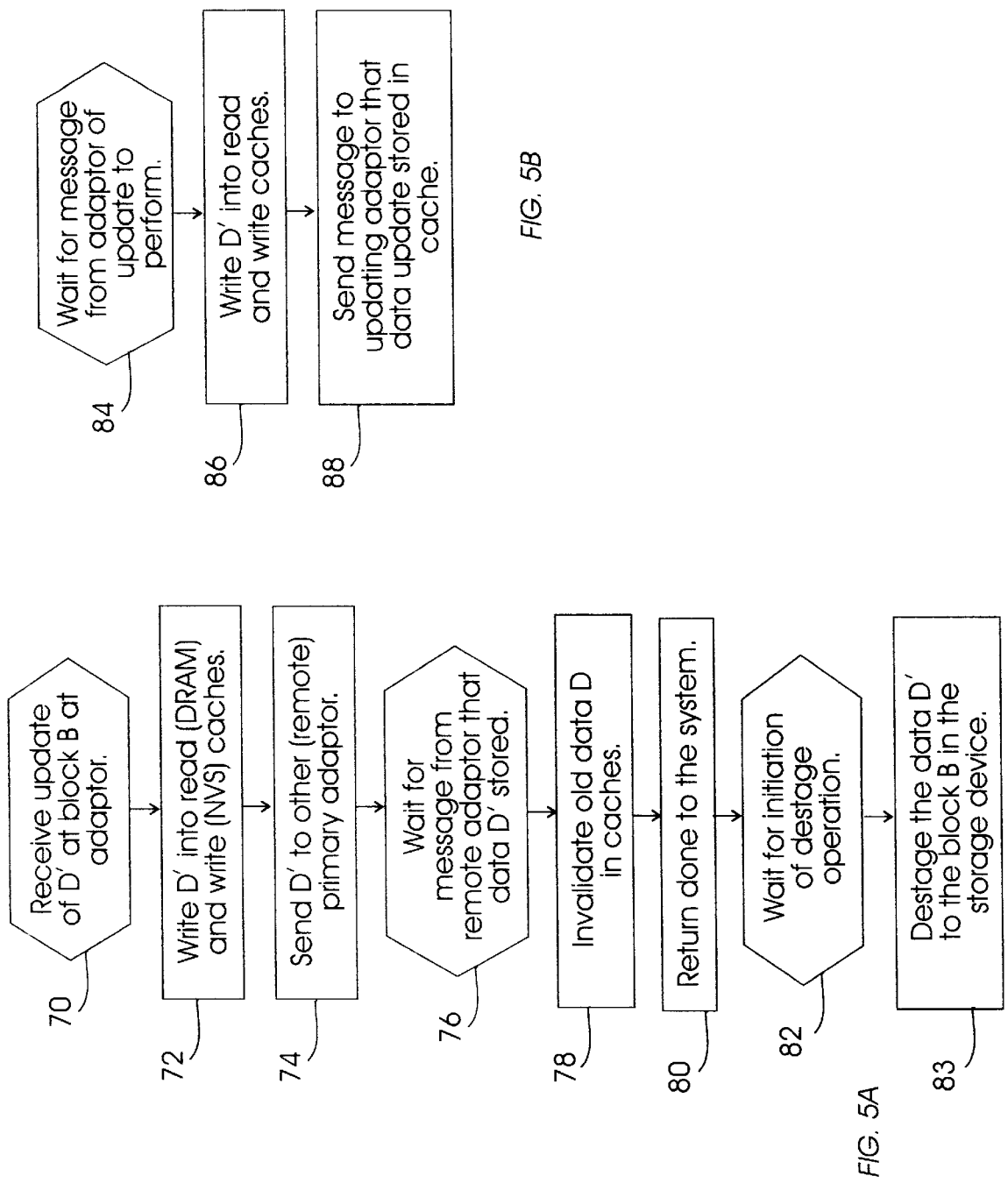

SYSTEM FOR UPDATING DATA IN A MULTI-ADAPTOR ENVIRONMENT

CROSS-REFERENCE TO RELATED APPLICATIONS

This application is related to the following co-pending and commonly-assigned patent applications, all of which are filed on the same date herewith, and all of which are incorporated herein by reference in their entirety:

"Distributed Storage System Using Front-End And Back-End Locking," by Jai Menon, Divyesh Jadav, Kal Voruganti, U.S. Pat. No. 6,272,662;

"System For Changing The Parity Structure Of A Raid Array," by Jai Menon, Divyesh Jadav and Deepak Kenchamanna-Hosekote, Ser. No. 09/129,012 ;

"Updating And Reading Data And Parity Blocks In A Shared Disk System," by Jai Menon, Ser. No. 09/129,067;

"Updating Data and Parity Data With and Without Read Caches," by Jai Menon, Ser. No. 09/128,438; and "Updating and Reading Data and Parity Blocks in a Shared Disk System with Request Forwarding," by Jai Menon and Divyesh Jadav, U.S. Pat. No. 6,128,762.

BACKGROUND OF THE INVENTION

1. Field of the Invention

The present invention relates to a system for updating data and destaging updated data in a shared storage device system.

2. Description of the Related Art

In Redundant Arrays of Independent Disks (RAID) systems, data files and related parity are striped across multiple disk drives. In storage subsystems which manage numerous hard disk drives as single direct access storage device (DASD), the methodologies have also been implemented in software for execution on a single host computer. This allows the single host computer, such as a personal computer, to implement RAID storage techniques on local hard disk drive space. Such software RAID methodologies are described in "Algorithms for Software and Low Cost Hardware RAIDS," by Jai Menon, Jeff Reigel, and Jim Wyllie, Document No. 1063-6390/95, pgs. 411–418 (IEEE 1995).

One problem with the single storage subsystem is the risk of failure. Techniques have been developed to improve failback and recovery in case of failures in the hardware controller. One such failback technique is the Fast Write Technique which provides two separate controllers on different power boundaries that control the flow of data from host systems to DASDs. If one controller fails, the other controller can continue writing data to the DASD. Typically a non-volatile storage unit (NVS) is included with each separate controller, such that each NVS connected to a controller backs up the data the other controller is writing to DASD. Such failback systems employing the two-controller failsafe structure are described in U.S. Pat. Nos. 5,636,359, 5,437,022, 5,640,530, and 4,916,605, all of which are assigned to International Business Machines, Corporation (IBM), the assignee of the subject application, and all of which are incorporated herein by reference in their entirety.

RAID systems can also be implemented in a parallel computing architecture in which there is no central controller. Instead, a plurality of independent controllers that control local hard disk storage devices are separate nodes that function together in parallel to implement RAID storage methodologies across the combined storage space managed by each node. The nodes are connected via a network. Parity calculations can be made at each node, and not centrally. Such parallel RAID architecture is described in "The TickerTAIP Parallel RAID Architecture," by Pei Cao, Swee Boon Lim, Shivakumar Venkataraman, and John Wilkes, published in ACM Transactions on Computer Systems, Vol. 12, No. 3, pgs. 236–269 (August, 1994), which is incorporated herein by reference in its entirety.

One challenge in shared disk systems implementing a parallel, shared disk RAID architecture is to provide a system for insuring that data is properly updated to disks in the system, that a write or update request invalidates stale data so such stale data is not returned, and that a read request returns the most current data. Further challenges include reducing the number of messages needed to be exchanged between multiple adaptors in a shared disk system when updating and destaging data, while at the same time keeping two adaptors informed on the status of updates and destages in the event that one of the adaptors fails.

SUMMARY OF THE INVENTION

To overcome the limitations in the prior art described above, preferred embodiments of the present invention disclose a system for updating a data block in a storage device. A first processing unit receives an update to a data block in a storage device. The first processing unit sends a first message including the update and information indicating data blocks that were recently updated to a second processing unit. The second processing unit stores the update in a second storage area and sends a second message to the first processing unit after receiving the first message. The first processing unit stores the update in a first storage area and transfers the update from the first storage area to the data block in the storage device.

In further embodiments, an update to a data block is destaged as follows. A first processing unit receives the update to the data block and stores the update in a storage area. The first processing unit determines whether it controls access to the data block in the storage device. The first processing unit sends a first message to a second processing unit requesting control of access to the data block from the second processing unit after determining that the first processing unit does not control access to the data block. Alternatively, the first processing unit sends a second message to the second processing unit indicating the blocks to be updated in the storage device after determining that the first processing unit does control access to the data block. After the second processing unit has sent a message to the first processing unit providing the first processing unit access control to the data block, the first processing unit then writes the update to the data block from the storage area to the data block in the storage device and sends a third message to the second processing unit indicating that the data block was updated.

With the preferred embodiments, access to data blocks is controlled to insure that parity updates are properly handled, data in memory locations is invalidated so that stale or outdated data is not returned to a later read request, stale data is not destaged to a storage device, and a read request returns the latest version of the data block. Moreover, with the preferred embodiments, the second processing unit is provided information via messaging on the progress of updates and destages, and information thereon. These messages allow the second processing unit to quickly recover and to continue the updating and destaging process in the event that the first processing unit fails.

BRIEF DESCRIPTION OF THE DRAWINGS

Referring now to the drawings in which like reference numbers represent corresponding parts throughout:

FIG. 5a illustrates logic executed by an updating adaptor updating a data block in accordance with preferred embodiments of the present invention;

FIG. 5b illustrates logic executed by a remote adaptor shadowing the updating adaptor executing the logic of FIG. 5a in accordance with preferred embodiments of the present invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
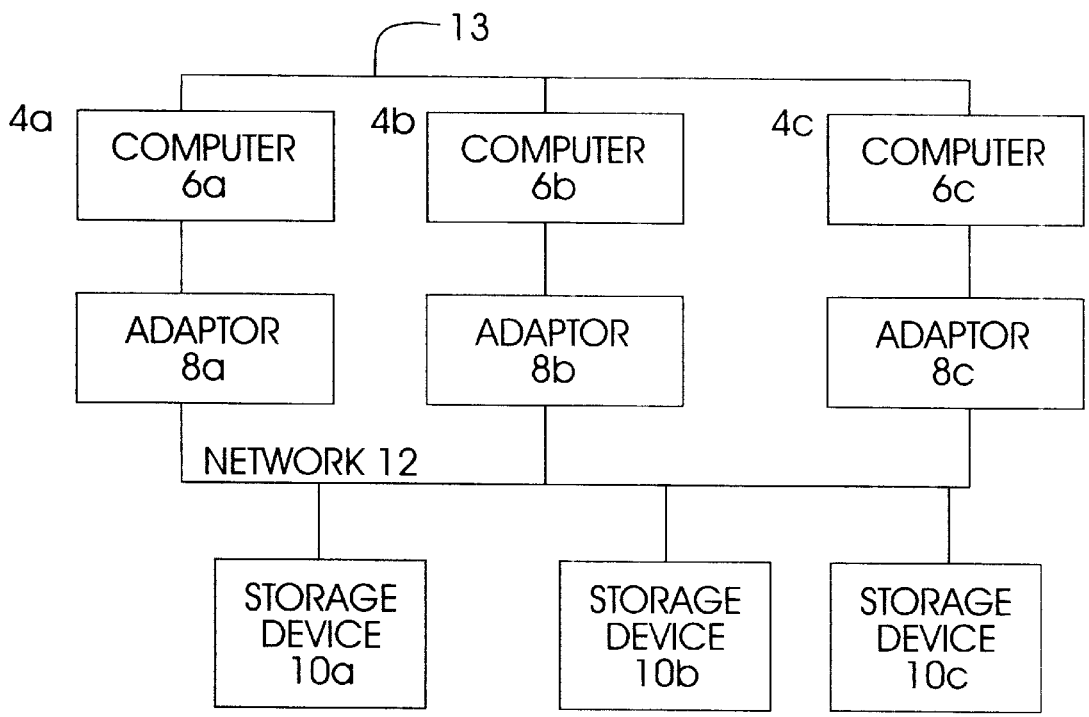
FIG. 1 illustrates a preferred hardware and software environment in which preferred embodiments of the present invention are implemented.

FIG. 1 illustrates a shared device environment comprised of nodes $4a, b, c$. Each node includes a computer $6a, b, c$, i.e., central processing unit, and an adaptor card $8a, b, c$. A plurality of storage devices $10a, b, c$ interface via a network 12 to the adaptor cards $8a, b, c$ and attached computers $6a, b, c$. The computer $6a, b, c$ may be a personal computer, workstation, mainframe, etc. The adaptor cards $8a, b, c$ interface with their respective computers $6a, b, c$ via a PC bus, such as the PCI bus, and include one or more disk interface ports, such as SCSI or Serial Storage Architecture (SSA) ports. The adaptor cards $8a, b, c$ include logic to execute the RAID algorithms. The storage devices $10a, b, c$ may be any suitable non-volatile storage device known in the art, including hard disk drives, magnetic tape, optical disks, non-volatile RAM, holographic units, etc. The nodes $4a, b, c$ and storage devices $10a, b, c$ interface via the network 12, which is preferably a high speed interconnect, such as SCSI, SSA, Fibre Channel, SNA, SAN, etc. Additionally, the network 12 may be a SCSI or SSA bus. In further embodiments more nodes than shown may be included in the shared device system 2. Each node may include multiple adaptors, multiple processors and/or local (non-shared) storage devices.

FIG. 1 further illustrates an additional network 13 providing an additional communication line among the computers $6a, b, c$. This additional network 13 may be comprised of any suitable network known in the art, e.g., ETHERNET, LAN, etc.

In preferred embodiments, the computers $6a, b, c$ run parallel processing software, such as the ORACLE PARALLEL SERVER™, the MICROSOFT® Wolfpack Clustering System or any other clustering software. ORACLE PARALLEL SERVER is a trademark of Oracle Corporation; MICROSOFT is a registered trademark of Microsoft Corporation. This parallel processing software allows the computers $6a, b, c$ to share storage devices $10a, b, c$ such that any node $4a, b, c$ may access any block in any of the storage devices $10a, b, c$. This parallel architecture allows data to be distributed across different storage devices $10a, b, c$ throughout the shared device system 2. The parallel processing software, implemented in the computers $6a, b, c$, may perform logical locking to insure that only one write request is made to a block in any of the storage devices $10a, b, c$, at any given time and to insure that an application does not attempt to read a block being modified by another application. To perform logical locking under control of the parallel processing software, the computers $6a, b, c$ would exchange messages, data, and information via the additional network 13. The adaptors $8a, b, c$ perform physical locking.

Figure 2:
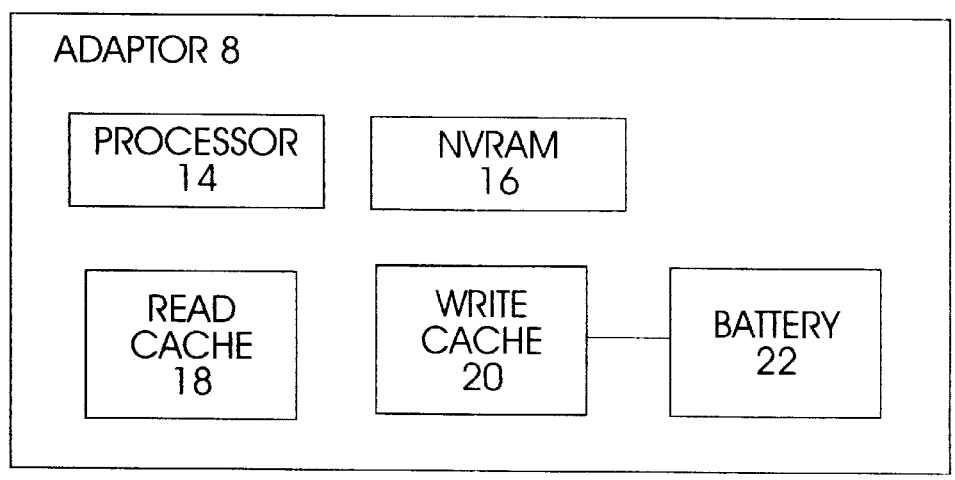
FIG. 2 illustrates a preferred hardware and software architecture of an adaptor in accordance with preferred embodiments of the present invention.

FIG. 2 illustrates a preferred embodiment of the adaptors $8a, b, c$. Each adaptor $8a, b, c$ includes a processor $14a, b, c$, a non-volatile RAM $16a, b, c$ for storing control information, a read cache $18a, b, c$, and a write cache $20a, b, c$. The read $18a, b, c$ and write $20a, b, c$ caches may be comprised of volatile memory, such as RAM, or a non-volatile memory unit, e.g., non-volatile RAM. In certain embodiments, the read cache $18a, b, c$ and write cache $20a, b, c$ may be areas within the same memory device or located within separate memory devices. In further embodiments, there may be no read $18a, b, c$ and/or write $20a, b, c$ caches. In preferred embodiments, the write caches $20a, b, c$ contain dirty blocks, which is data intended for a block in the storage device $10a, b, c$ that is more recent than the block actually maintained in the storage device $10a, b, c$. Once the data is written from the write cache $20a, b, c$ to the storage device $10a, b, c$, the copy of the data in the cache is "clean." Because the write cache $20a, b, c$ only maintains "dirty" blocks, the clean copy in the cache after the update is considered to be in the read cache $18a, b, c$, not the write cache $10a, b, c$ anymore. The components of the adaptors $8a, b, c$ may be implemented as PC cards such the PC ServeRAID SCSI adaptor from IBM. Alternatively, components and functionality of the adaptors $8a, b, c$ could be implemented in the computers $6a, b, c$.

In certain embodiments, the read cache $18a, b, c$ may be implemented in a volatile memory device, e.g., DRAM, RAM, etc., and the write cache $20a, b, c$ may be attached to a battery 22 which makes the write cache $20a, b, c$ a non-volatile memory device. In such case, an update to a block is initially written in both the RAM (read cache) and the battery 22 backed up write cache $20a, b, c$. Once the dirty data is destaged to the storage device $10a, b, c$, the copy from the write cache $20a, b, c$ is marked as invalid for later removal, leaving only the clean copy in the RAM, i.e., read cache. In alternative embodiments, the dirty data may be sent to all other adaptors in the system to invalidate any stale data in their caches. In embodiments with only a single memory device for the read $18a, b, c$ and write $20a, b, c$ caches, the data is considered to be in the write cache $20a, b, c$ prior to destaging and in the read cache $18a, b, c$ after destaging even though the data remains in the same memory device.

In preferred embodiments, the adaptors $8a, b, c$ must satisfy all of the following correctness conditions:

(1) a request to write a data block from adaptor $8a$ simultaneous with a request to write another data block from adaptor 8b, where the two data blocks have the same parity block, causes a correct parity update in the sequence which the updates were made;

(2) a write request through one adaptor 8a for a block in the read 18b or write 20b cache at another adaptor 8b causes the invalidation of data in cache 18b or 20b so that stale data is not returned to a subsequent read request or later destaged to the storage device 10b from old data in caches 18b, 20b; and (3) a read request through one adaptor 8a for a block cached at adaptor 8b in read 18b or write 20b cache, returns the latest version of the data block from adaptor 8b.

Those skilled in the art will recognize that alternative conditions to the three mentioned above may also be satisfied.

Parity in a RAID Environment

Figure 3A:
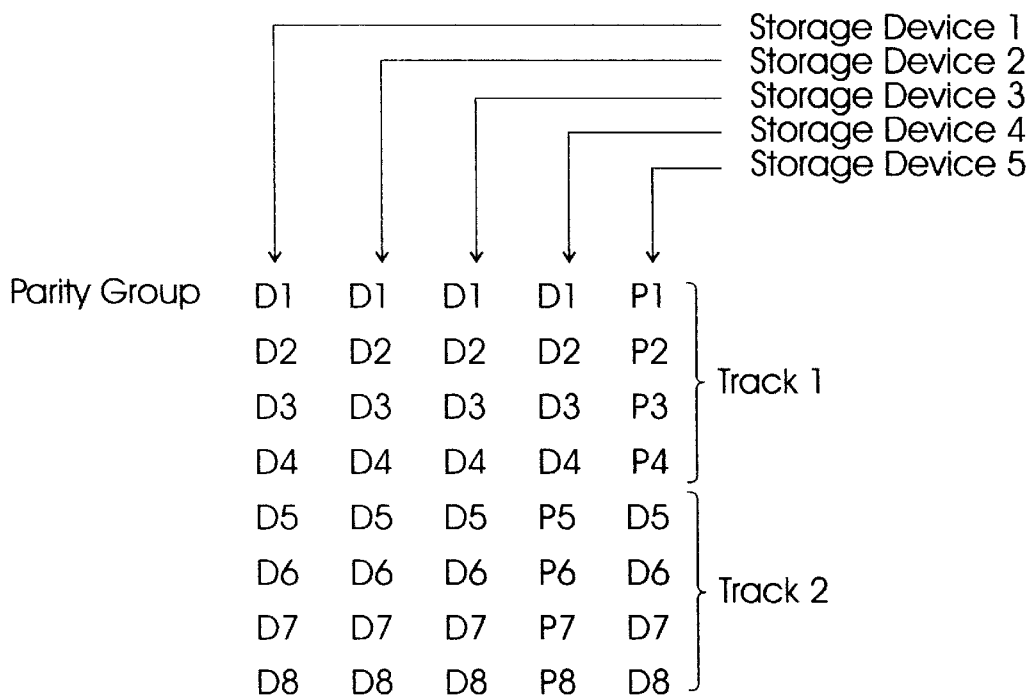
FIGS. 3a and b illustrate embodiments of how data and parity blocks are arranged on storage devices.

FIG. 3a illustrates a 4+P RAID disk array in which a parity block $P_i$ protects four data blocks $D_i$ in four storage devices. Each vertical column represents a storage device. A parity group is a row in the illustration of FIG. 3a that consists of four data blocks $D_i$, one in each storage device, and a parity block $P_i$ maintaining parity information for the four data blocks $D_i$. A parity value $P_i$ is the exclusive OR of the data blocks $D_i$ in the same parity group of a given i. If a disk fails, then the data can be recreated by processing the parity block ($P_i$) and the remaining data blocks $D_i$ for the parity group. FIG. 3a further shows the rotation of parity in that parity blocks $P_5$ through $P_8$ are on a different disk, storage device 4, than the previous parity blocks which are on storage device 5.

In preferred embodiments, a parity block can be updated with the following exclusive OR operation, where the new parity ($P_i'$)=(old data ($D_i$) XOR new data ($D_i'$) XOR old parity ($P_i$).

Figure 3B:
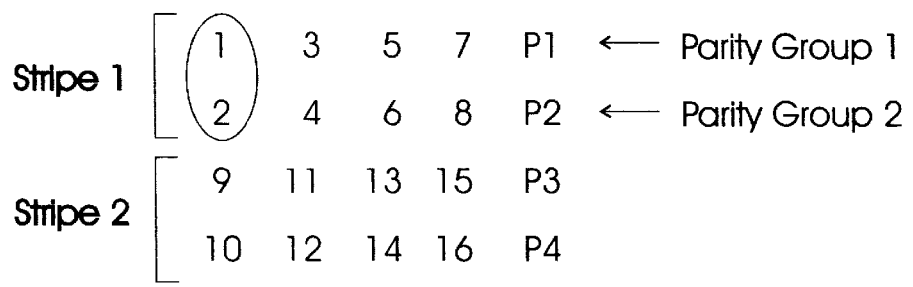

In certain embodiments, data may be stored in "stripe units" on the storage devices. FIG. 3b illustrates a "stripe unit" of data. A stripe unit consists of multiple consecutive blocks of data on a storage device. The "stripe unit" shown in FIG. 3b has two consecutive blocks of data, blocks 1 and 2. A "stripe" consists of multiple stripe units. The "stripe" shown in FIG. 3b has five stripe units. In the exemplar of FIG. 3b, a stripe unit includes blocks from two parity groups throughout each storage device. In alternative embodiments a "stripe unit" and "stripe" could be defined in alternative manners, e.g., including more than two blocks of data, depending on the number of storage devices and parity groups.

In alternative embodiments, other parity schemes may be utilized, such as mirrored RAID, bit-interleaved parity, block-interleaved distributed-parity or P+Q redundancy, etc. These various RAID schemes are discussed in "RAID: High-Performance, Reliable Secondary Storage," by Peter M. Chen, Edward K. Lee, Garth A. Gibson, Randy H. Katz, and David A. Patterson, published in ACM Computing Surveys, Vol. 26, No. 2, pgs. 145–185 (June, 1994), which publication is incorporated herein by reference in its entirety.

Front End And Back End Locking Schemes

A write cache 20a in an adaptor 8a that stores data that is more recent than the version of that data in the corresponding block in the storage device 10a is a "dirty block." When data is first updated from D to D', the dirty data D' is stored in the write cache 20. A copy of the dirty data D' may be maintained in the write cache 20a as a backup copy before the data has been destaged to the storage device 10a. Once the dirty data is destaged from the write cache 20a to the storage device 10a, the write cache 20a copy is referred to as a "clean block." After destaging, any backup copy of the dirty data in the write cache 20a may be eliminated, leaving a copy of the destaged "dirty data" in the read cache 18a. After a dirty block is destaged to the storage device 10a, the "clean block" is considered to be within the read cache 18a. The write cache 20a is often needed to provide a buffer for data as it is being transferred between the storage device 10a and any other node 4a, b, c. Data transfers with respect to the storage device 10a require time and the buffers of the read 18a and write 20a cache allow other activities to continue while data is being transferred to and from the storage device 10a.

Data is transferred to a node 4a, b, c for storage in the attached storage devices 10a, b, c in two phases, a front-end phase and a back-end phase. A front-end lock refers to a block of data to which a read or data update request is directed, whether a version of that block of data is located in the storage device 10a, b, c, read cache 18a, b, c, or write cache 20a, b, c. A back-end lock refers to a state associated with a data block maintaining parity data or involved in a destaging operation.

In the front-end phase, data is written to the write cache 20a, b, c, but not moved to the attached storage device 10a, b, c. In the back-end phase, data is destaged from the write cache 20a, b, c to the attached storage device 10a, b, c. The adaptors 8a, b, c at each node 4a, b, c include logic, e.g., software and/or hardware, to issue locking commands to control access to the data block represented by the lock unit, whether the most recent version of that data block is maintained in the storage devices 10a, b, c, read cache 18a, b, c, and write cache 20a, b, c. An adaptor 8a, b, c cannot access data unless that adaptor controls or owns the lock unit for that data block. Locking commands to control access to data insure that stale data at any node 4a, b, c is invalidated and that a read request gets the most current copy of data, wherever that most current copy of data may reside in the shared device system 2. Further, the back-end phase of locking insures that updates of parity blocks on the disk drives are synchronized. As discussed, parity data is stored throughout the shared device system 2, such that a storage device 10a, b, c may include parity for data maintained throughout the shared device system 2.

A lock state applies to one or more data blocks referred to as a locking unit. A version of data maintained in the storage devices 18a, b, c may be maintained in the read 18 or write 20 caches. A lock state could apply to a data block lock unit, whether that data block is maintained only in the storage device 10a, b, c and versions of the lock unit data block maintained in the read 18 or write 20 cache. In preferred embodiments, the front-end and back-end locking schemes are separate and do not conflict. Thus, parity updates can be done independently of data updates. In alternative embodiments, a unified locking scheme may be used. In a unified locking scheme, parity data or data in the write cache 20a, b, c cannot be updated if the other end is involved in a destage operation.

In the front end phase, locking is used to insure that update requests invalidate stale data in the read 18a, b, c or write 20a, b, c caches of other adaptors 8a, b, c and that read requests get the most current copy of data. In the back end phase, locking is used to insure that update of parity on the storage devices 10a, b, c are synchronized between different adaptors updating to the same parity block. For the front end phase, an appropriate lock unit might be a data block, stripe, or any other unit of data involved in read or write operations. For the back end phase, the lock unit might be the parity group for the unit of updated data.

In certain embodiments, only an adaptor 8a, b, c that is designated the "owner" of a lock unit may place a lock on the lock unit. Such embodiments requiring lock ownership are described in the related application "Distributed Storage System Using Front-End And Back-End Locking," Ser. No. 09/129,004, incorporated by reference above. In embodiments without lock ownership, access is controlled by designating two or more adaptors 8a, b, c as the "primary adaptors" for a lock unit. Only primary adaptors can access the area of the storage device 10a, b, c corresponding to the lock unit. If an adaptor other than the primary adaptor originates a request for a particular lock unit, i.e., data block or stripe, the request is forwarded to one of the primary adaptors.

Updating Data Without Read Caches

Figure 4A:
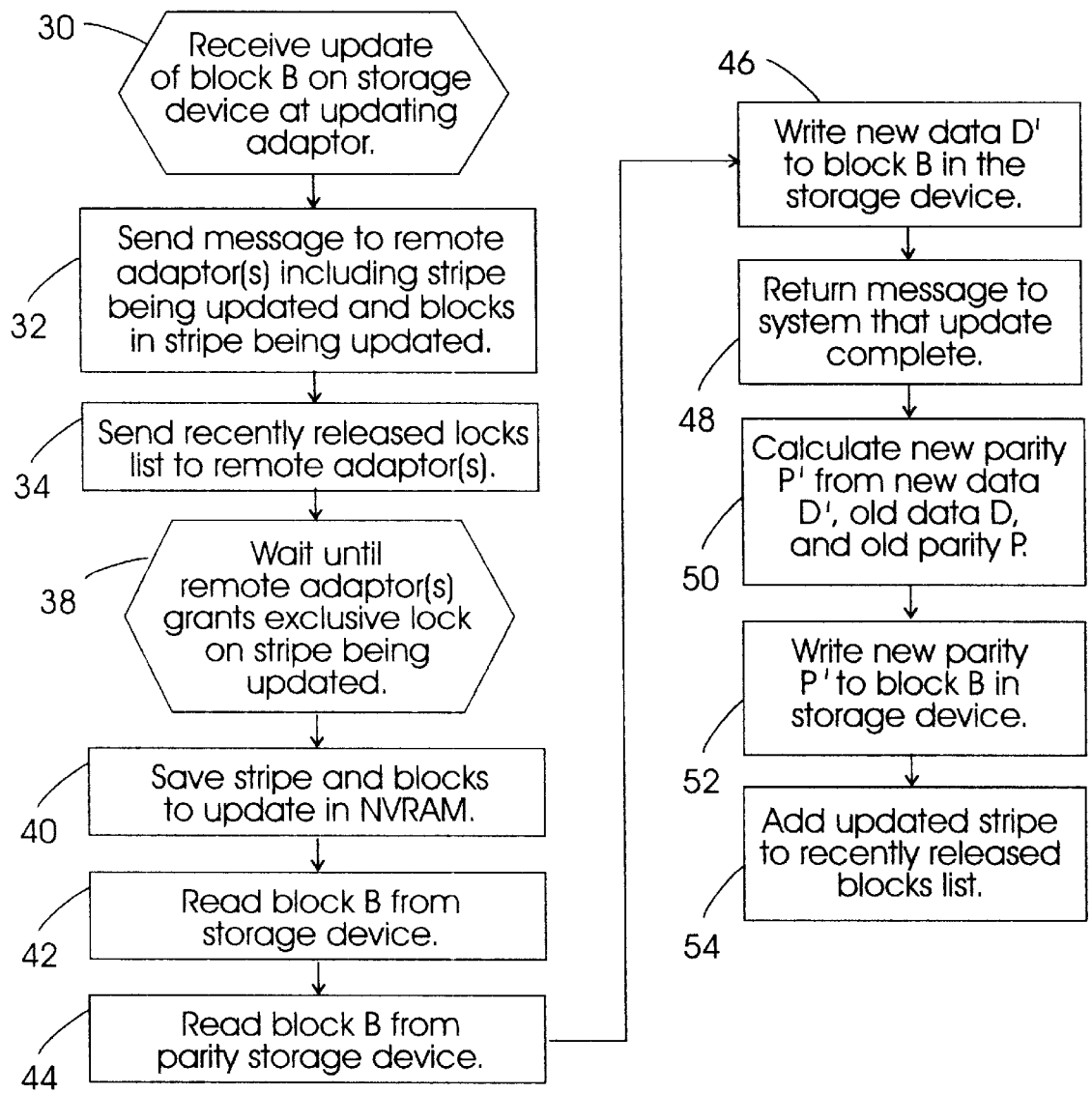
FIGS. 4a and b illustrate logic for updating a data block in accordance with preferred embodiments of the present invention.
Figure 4B:
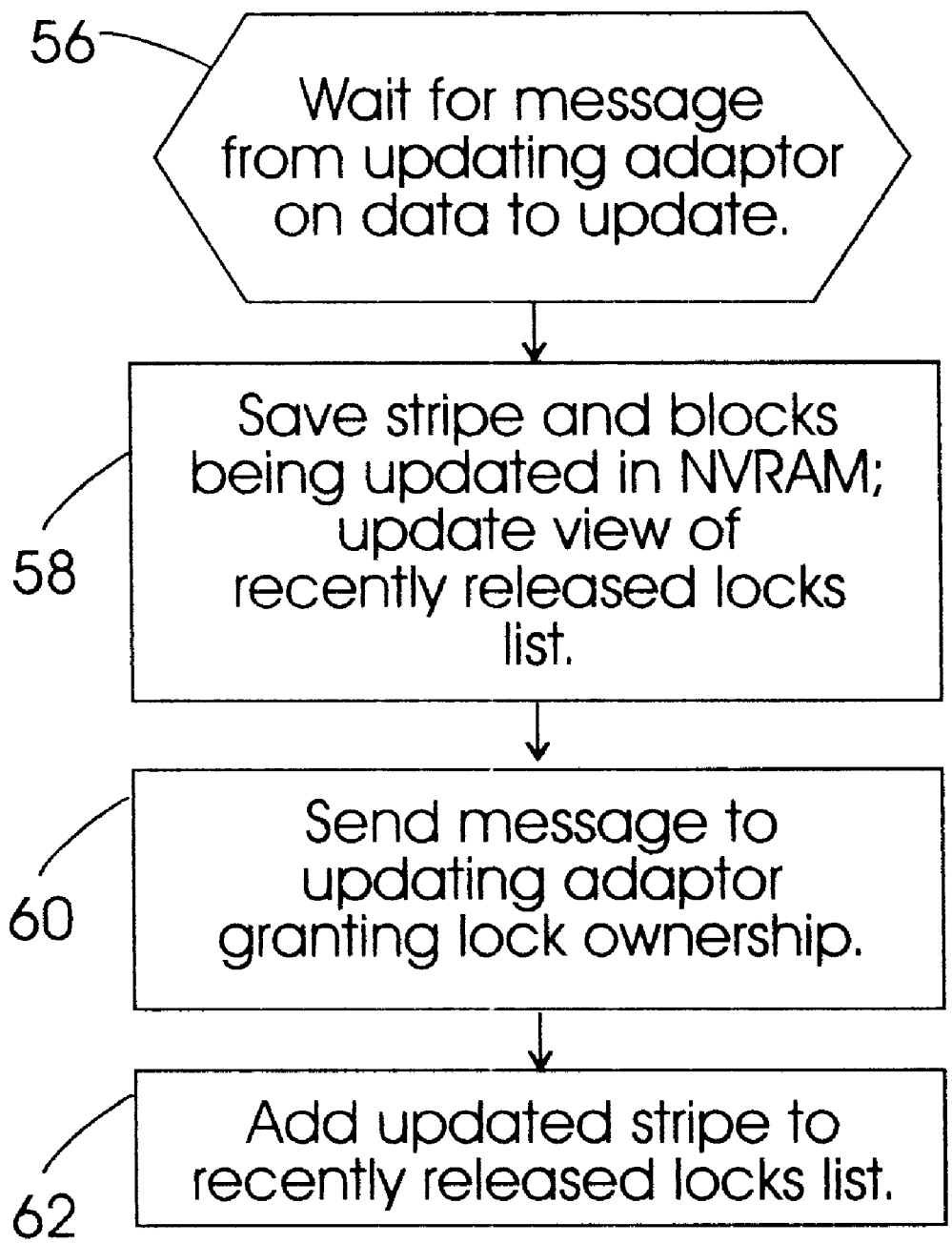

FIGS. 4a, b illustrate logic implemented in a memory area of the adaptors 8a, b, c. Alternatively, the logic may be implemented in the computers 6a, b, c, which in turn control the adaptors 8a, b, c to update and read a block of data in a storage device 10a, b, c. The logic of FIGS. 4a, b assumes that the adaptor 8a, b, c does not include or is not utilizing read cache 18. In adaptors without read cache 18a, b, c, the only correctness condition that must be satisfied is that data updates to different data blocks in the same parity group should cause the updating of parity. FIG. 4a is logic implemented in the adaptor performing the update operation, e.g., the updating adaptor 8a, and FIG. 4b is logic implemented in the peer adaptor shadowing the updating adaptor 8a, e.g., remote adaptor 8b. All adaptors include the logic of FIGS. 4a, b as any adaptor can be the updating adaptor or the remote adaptor.

The logic of FIGS. 4a, b requires only 2*(N−1) messages per update in the N adaptor case. The logic of FIGS. 4a, b utilizes a data structure maintained in the memory of each adaptor referred to as a "recently released locks list." For a given adaptor 8a, b, c, the locks list indicates those locks on stripes that have recently been released. Control begins at block 30 which represents the updating adaptor 8a receiving an update to a block B in storage device, e.g., storage device 10a, from D to D'. Control transfers to block 32 which represents the updating adaptor 8a sending a message to the remote peer adaptors 8b, c, i.e., the granting adaptors, including the stripe and blocks therein being updated. If there is only one other peer adaptor, then the message would be sent to the other remote adaptor. If there are N adaptors, then the message must be sent to all N−1 adaptors. Control transfers to block 34 which represents the updating adaptor 8a further transmitting with the message the recently released locks list. In preferred embodiments, the updating adaptor 8a sends in a single message the update to the data block, at block 32, and the recently released locks list, at block 34. If there are further adaptors, the updating adaptor 8a would send the message to all other N−1 adaptors in the system. Control transfers to block 36 which represents the remote adaptors 8b, c saving the stripes and blocks being updated in their NVRAM 16b, c, and updating their recently released locks list with the recently released locks included in the list provided by the updating adaptor 8a.

At block 38, the updating adaptor 8a waits for the remote adaptors 8b, c to grant an exclusive lock on the stripe being updated. After receiving the locks for the stripes being updated, control transfers to block 40 which represents the updating adaptor 8a saving the stripe and blocks being updated in its NVRAM 16a. Control transfers to block 42 which represents the updating adaptor 8a reading the old block B of data (D) from the storage device 10a. Control transfers to block 44 which represents the updating adaptor 8a reading the old parity P from the block B in the storage device storing the parity data for the stripes, e.g., storage device 10b. Control transfers to block 46 which represents the updating adaptor 8a writing the new data D' to block B in the storage device 10a. At block 48, the updating adaptor 8a returns a message to the system indicating that the update is complete.

Control transfers to block 50 which represents the updating adaptor 8a calculating the new parity P' from the old parity P, old data D, and new data D'. In preferred embodiments, the adaptor 8a may take the exclusive OR of the data to calculate parity, i.e., D xor D' xor P. Control transfers to block 52 which represents the adaptor 8a writing the new parity P' to block B in the storage device 10b. Control transfers to block 54 which represents the updating adaptor 8a, b, c updating its recently released locks list to show that the lock for block B including the updated stripe was released. With the logic of FIG. 4a, the updating adaptor 8a does not send a message to the remote adaptors 8b, c indicating that the lock is released.

FIG. 4b illustrates logic implemented in the remote adaptor(s), e.g., remote adaptor 8a, to shadow and provide a back-up for the updating operations performed by the updating adaptor 8a. Control begins at block 56 which represents the remote adaptor 8a waiting for a message from the updating adaptor 8a on the data to update. Control transfers to block 58 which represents the remote adaptor 8b saving the stripe being updated and the data update in its NVRAM 16. Control transfers to block 60 which represents the remote adaptor 8b sending a message to the updating adaptor 8a granting lock ownership of the stripe or block to update. Control then transfers to block 62 which represents the remote adaptor 8b adding the updated data to the recently released locks list. By updating the recently released lock list, the remote adaptor 8b is indicating the occurrence of the update and the release of the lock from the updating adaptor 8a. Use of the recently released list combines the release of the exclusive locks with the acquisition of exclusive locks for all future update requests.

In case of a failure of the updating adaptor 8a before it has updated the data, the remote adaptor(s) have a back-up copy of the update and information indicating the block to update. The remote adaptor(s) can use this information to complete the data update and update the parity information for the update in an expedited manner. With the recently released lock list, only two messages are transmitted during an update to inform the remote adaptor of updates to allow for fast recovery in case the updating adaptor fails. By limiting the number of messages to only two in the two adaptor case or 2*(N−1) in the N adaptor case, embodiments utilizing the recently released locks list significantly reduce network traffic.

Updating With Read and Write Caches

As discussed, in embodiments with both a read 18a, b, c and write cache 20a, b, c, the write cache 20a, b, c may be battery backed-up and the read cache 18a, b, c may be maintained in a volatile memory device, e.g., RAM, DRAM, etc., within the adaptors 8a, b, c. FIGS. 5a, b illustrate logic implemented in the adaptors 8a, b, c, to update data when the adaptors include both read 18*a, b, c* and write 20*a, b, c* caches. In the preferred embodiments of the logic of FIGS. 5*a, b*, the write cache 20*a, b, c* is non-volatile, i.e., battery 22 backed-up. If the read cache 18*a, b, c* is in a separate, volatile memory device, than a copy of the updated data may be initially written into the volatile read cache 18*a, b, c* and the battery 22 backed-up, non-volatile write cache 20*a, b, c*. This insures that in the event of a failure of the adaptor 8*a, b, c* including the updated data, the updated data will be unavailable until the battery 22 backed-up write cache 20*a* can be accessed and read. By maintaining copies of updated data in different adaptors 8*a, b, c*, the data is still immediately available in the event that one of the adaptors fails.

The logic of FIGS. 5*a, b* is described with respect to a two adaptor case, where two primary adaptors, e.g., adaptors 8*a, b*, handle access to a block B in storage device 10*a*. FIG. 5*a* illustrates logic executed by the adaptor performing the update, e.g., the updating adaptor 8*a*, and FIG. 5*b* illustrates logic executed by the remote primary adaptor, e.g., remote adaptor 8*b*, shadowing the updating adaptor 8*a*. If a request to update data at block B is first sent to a non-primary adaptor, e.g., adaptor 8*c*, then adaptor 8*c* forwards the request to one of the primary adaptors 8*a, b*. FIGS. 5*a, b* are described with respect to an update of data D on block B in a storage device, e.g., storage device 10*a*, with new data D', which further involves an update to parity P of new parity P'. Control begins at block 70 which represents the updating adaptor 8*a*, receiving an update D' to block B. Control transfers to block 72 which represents the updating adaptor 8*a* writing the updated data D' into its read cache 18*a* and write cache 20*a*. As discussed, in preferred embodiments, the read cache 18*a* is located in a volatile memory device and the write cache 20*a* is located in a battery 22 backed-up, non-volatile memory device. Control transfers to block 74 which represents the adaptor 8*a* sending the update D' to the other remote primary adaptor 8*b*.

Control then transfers to block 76 which represents the updating adaptor 8*a* waiting for a message from the remote adaptor 8*b* that the data D' was stored at the remote adaptor 8*b*. Control transfers to block 78 which represents the updating adaptor 8*a* invalidating any old versions of the new data D', i.e., D, in its caches. At block 80, the updating adaptor 8*a* returns a done message to the system, indicating that the updated data D' resides in two adaptors 8*a, b*. Control transfers to block 82 which represents the updating adaptor 8*a* waiting for the initiation of a destage operation. Data may be destaged from the write cache 20*a, b, c* after the write cache reaches a predetermined capacity threshold, e.g., 70% full, or when data has been in the write cache 20*a, b, c* for a predetermined period of time. Control then transfers to block 83 which represents the updating adaptor 8*a* destaging the data D' to one of the storage devices 10*a, b, c* including block B.

FIG. 5*b* illustrates logic executed by the remote adaptor 8*b* to process messages from the updating adaptor 8*a* executing the logic of FIG. 5*a*. Control begins at block 84 which represents the remote adaptor 8*b* waiting for a message from the updating adaptor 8*a* to perform an update. Control transfers to block 86 which represents the updating adaptor 8*a* writing the data update into its read 18*b* and write 20*b* caches. Control then transfers to block 88 to send a message to the updating adaptor 8*a* indicating that the update is cached at the remote adaptor 8*b*.

Figure 6A:
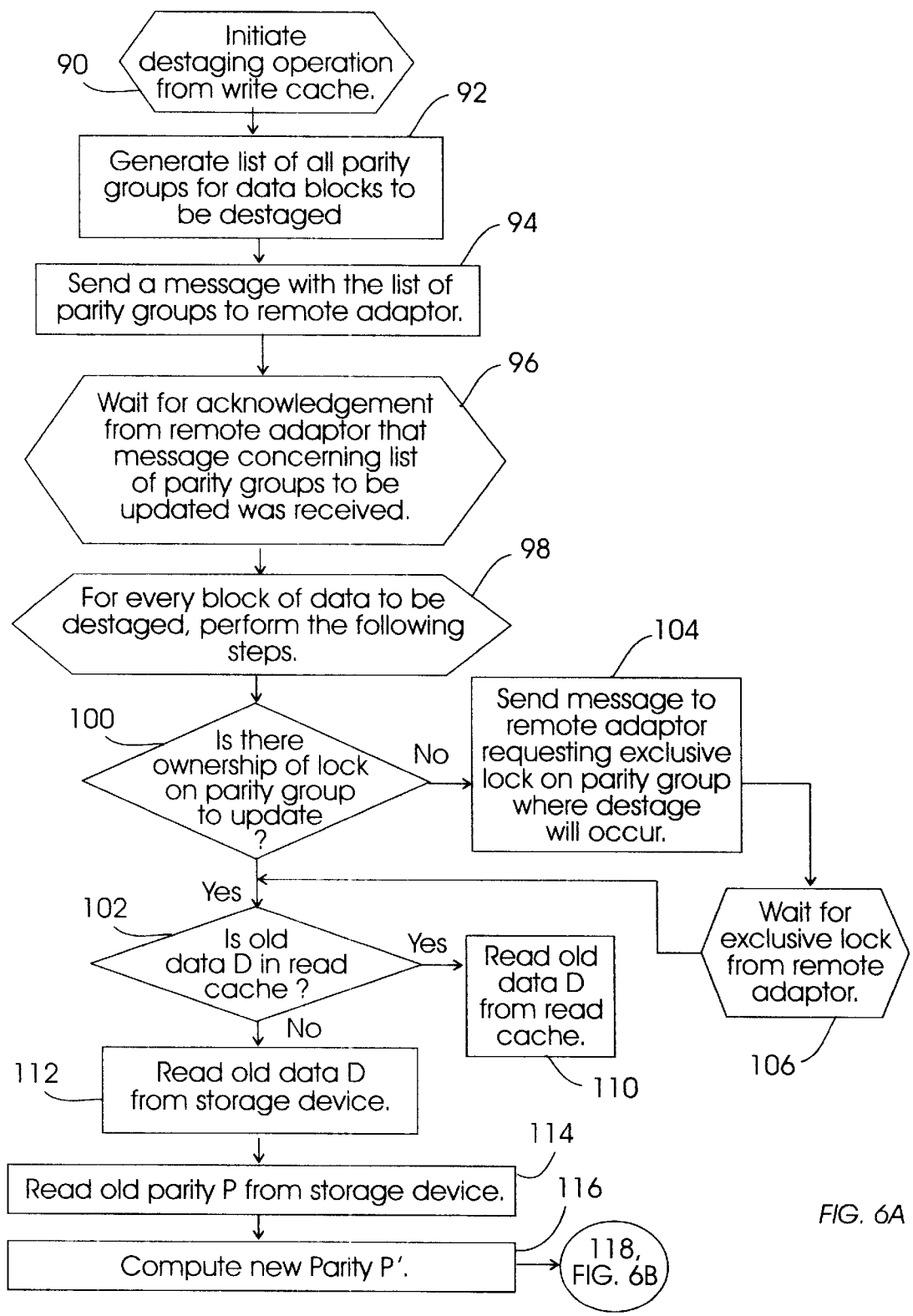
FIGS. 6a, b, and 7 illustrate logic for destaging a data block in accordance with preferred embodiments of the present invention.
Figure 7:
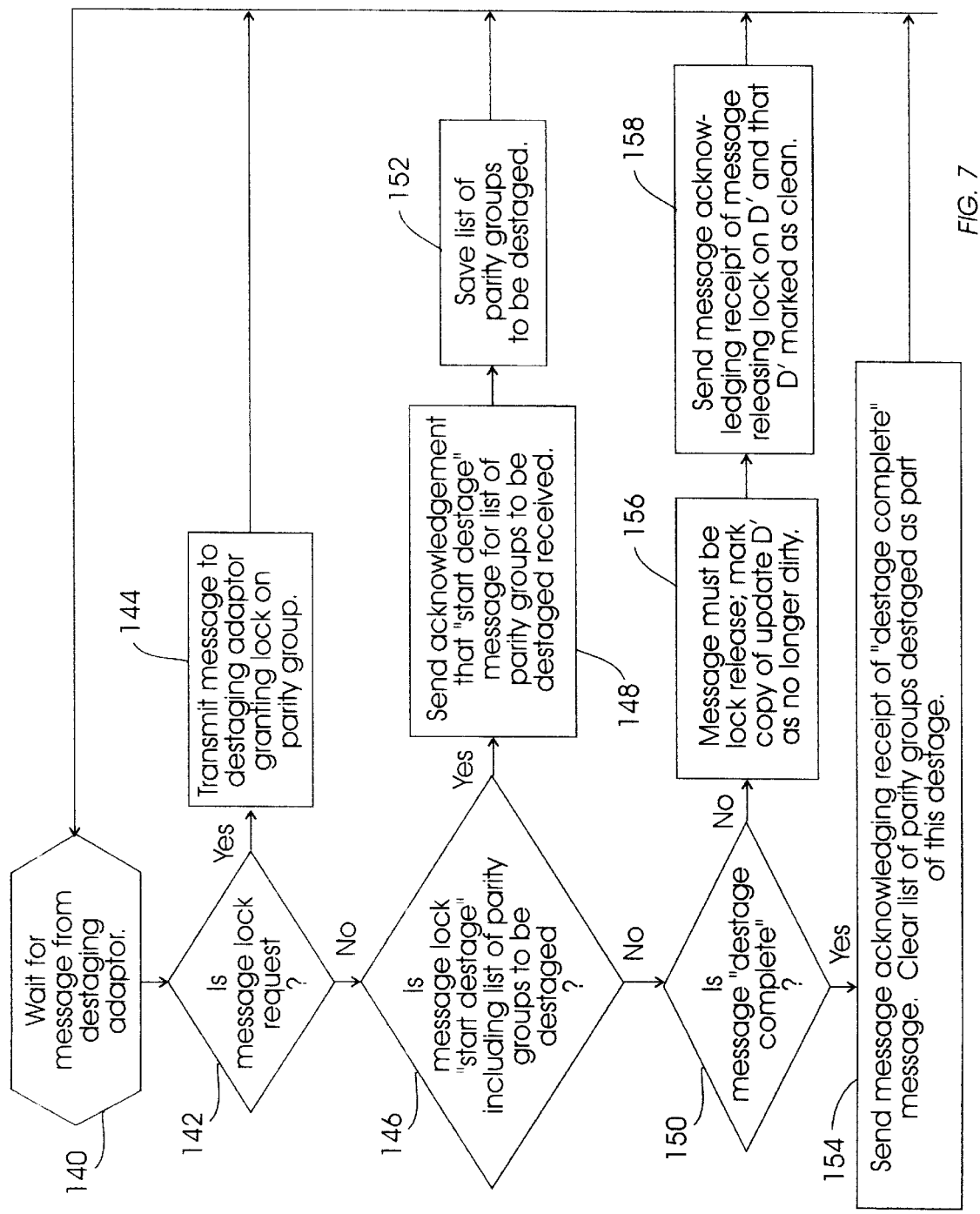

FIGS. 6*a, b*, and 7 illustrate logic implemented in the adaptors 8*a, b, c* to destage data from the write caches 20*a, b, c* in accordance with preferred embodiments of the present invention. In the exemplar, an update in data block B in storage device 10*a* is destaged. As discussed, at least two adaptors control access to a block. To destage data, the adaptor performing the destage, e.g., destaging adaptor 8*a*, must obtain an exclusive lock on the stripe containing the block to be updated in the storage device 10*a, b, c* from the other adaptor(s) also controlling access to the stripe containing the block to be updated, e.g., the remote adaptor 8*b*. If there are more than two adaptors controlling access to a lock unit, e.g., stripe, block, etc., in a storage device 10*a, b, c*, then the destaging adaptor 8*a* must obtain the exclusive lock from all such adaptors controlling access. FIGS. 6*a, b* illustrate logic executed by the destaging adaptor 8*a* to destage data and FIG. 7 illustrates logic executed by the remote adaptor 8*b* in response to destaging operations performed by the destaging adaptor 8*a*.

Control begins at block 90, which represents the destaging adaptor 8*a* initiating a destaging operation from the write cache 20*a*. Control transfers to block 92 where the destaging adaptor 8*a* generates a list of all parity groups including data blocks to be destaged. Control transfers to block 94 which represents the destaging adaptor 8*a* sending a message including the list of parity groups to be destaged to the remote adaptor 8*b*. Control transfers to block 96 which represents the destaging adaptor 8*a* waiting for acknowledgment from the remote adaptor 8*b* that the message including the list of parity groups to update was received. Control then transfers to block 98 which represents the destaging adaptor 8*a* performing steps 100 through 130 for each block of data to be destaged. Control transfers to block 100 which represents the destaging adaptor 8*a* determining whether it has ownership of the lock on the parity group including the data block to update. If so, control transfers to block 102; otherwise, control transfers to block 104 which represents the destaging adaptor 8*a* sending a message to the remote adaptor 8*b* requesting the exclusive lock on the parity group where the destage will occur. Control then transfers to block 106 which represents the destaging adaptor 8*b* waiting for the grant of the exclusive lock from the remote adaptor 8*b*. By granting the exclusive lock, the remote adaptor 8*b* would know which block was being updated by the destaging operation.

Figure 6B:
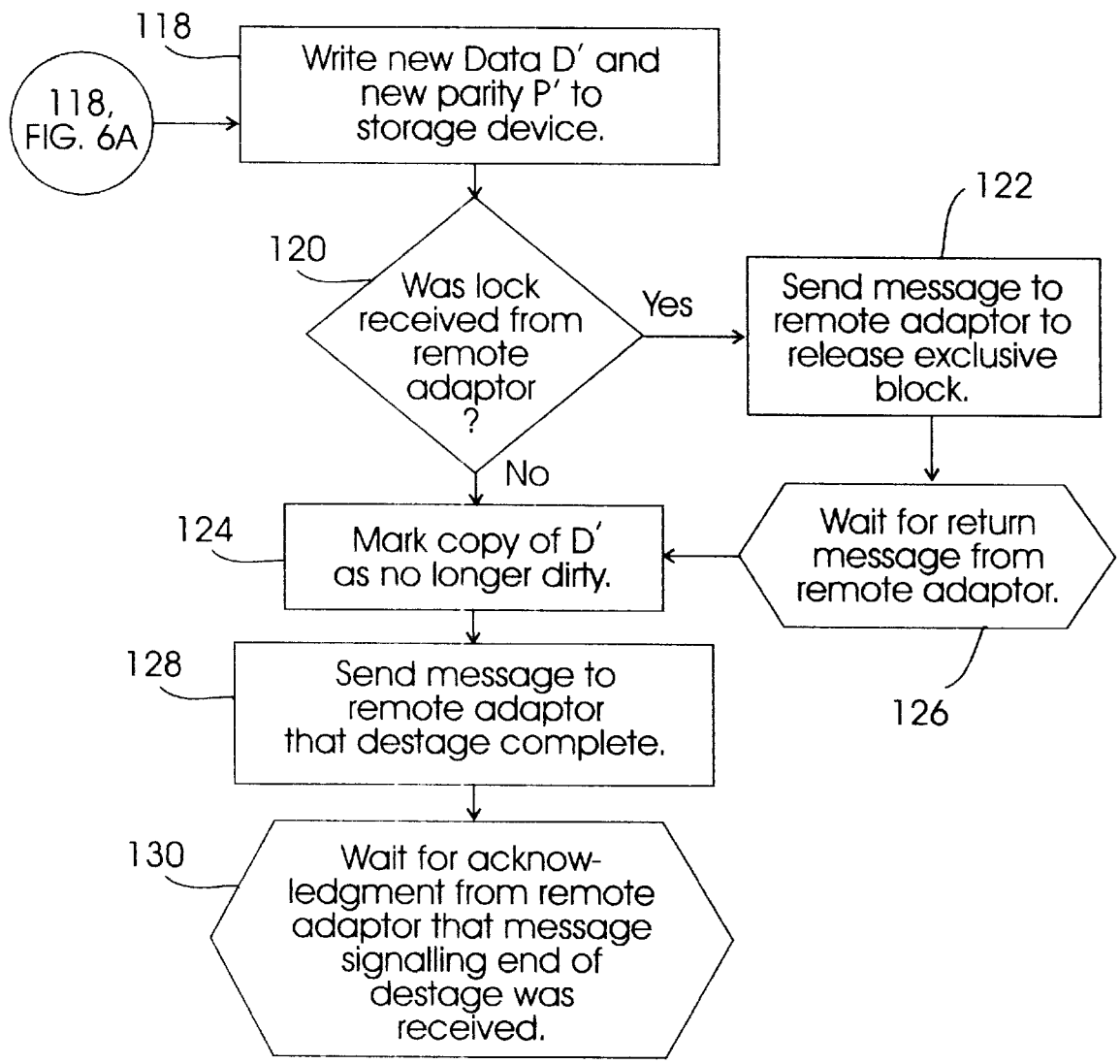

From blocks 100 or 106, when the destaging adaptor 8*a* has lock ownership, control transfers to block 102 which represents the destaging adaptor 8*a* determining whether the old data D at block B is in the read cache 18*a*. If so, control transfers to block 110; otherwise, control transfers to block 112. Block 110 represents the destaging adaptor 8*a* reading the old data D from the read cache 18*a*. Block 112 represents the destaging adaptor 8*a* reading the old data D from block B in the storage device 10*a*. From blocks 110 and 112, control transfers to block 114 which represents the destaging adaptor 8*a* reading the old parity P from block B in the storage device maintaining such parity data, e.g., storage device 10*b*. Control then transfers to block 116 which represents the destaging adaptor 8*a* computing the new parity. In preferred embodiments, the destaging adaptor 8*a* computes the new parity P' from the exclusive OR of D xor D' xor P. Control then transfers to block 118 in FIG. 6*b* which represents the destaging adaptor 8*a* writing the new data D' and new parity P' to storage devices 10*a, b*, respectively.

Control then transfers to block 120 which represents the destaging adaptor 8*a* determining whether it received a lock from the remote adaptor 8*b* for the parity group just updated. If so, control transfers to block 122 which represents the destaging adaptor 8*a* sending a message to the remote adaptor 8*b* to release the exclusive lock previously granted.

Otherwise, control transfers to block 124. From block 122, control transfers to block 126 which represents the destaging adaptor 8a waiting for a return message from the remote adaptor 8b indicating that the lock was released. From block 120 or 126, control transfers to block 124 which represents the destaging adaptor 8a marking the copy of the new data D' as no longer dirty. Control then transfers to block 128 which represents the destaging adaptor 8a sending a message to the remote adaptor 8b that the destage is complete. At block 130, the destaging adaptor 8a waits for acknowledgment from the remote adaptor 8b that the message signaling the end of destage was received.

FIG. 7 illustrates logic executed by the remote adaptor 8b in response to messages received from the destaging adaptor 8a when destaging data in accordance with the logic of FIGS. 6a, b. Control begins at block 140 which represents the remote adaptor 8b receiving a message from the destaging adaptor 8a. Control transfers to block 142 which represents the remote adaptor 8b determining whether the destaging adaptor 8a has requested a lock on the parity group including the block to destage. If so, control transfers to block 144 to transmit a message to the destaging adaptor 8a granting lock ownership for the requested parity group. Control then transfers back to block 140 to process further messages. If the message was not a lock request, then control transfers to block 146 which represents the remote adaptor 8b determining whether the message is a "start destage" message indicating that the destaging adaptor 8a is initiating a destaging operation and including a list of parity groups to be destaged. If so, control transfers to block 148 which represents the remote adaptor 8b sending an acknowledgment message to the destaging adaptor 8a that the "start destage" message and accompanying parity groups were received. Control then transfers to block 152 which represents the remote adaptor 8b saving the list of parity groups to be destaged.

If the message was not a "start destage" message, then control transfers to block 150 which represents the remote adaptor 8b determining whether the message is a "destage complete" message. If so, control transfers to block 154; otherwise control transfers to block 156. Block 154 represents the remote adaptor 9b sending a message to the destaging adaptor 8a acknowledging receipt of the "destage complete" message and clearing the list of parity groups destaged. If the message is not a "destage complete" message, then the message must be a lock release message. In such case, control transfers to block 156 which represents the remote adaptor 8b marking the copy of the update data D' as no longer dirty. Control then transfers to block 158 which represents the remote adaptor 8b sending a message to the destaging adaptor 8a acknowledging receipt of the message releasing the lock on D' and that the data D' was marked as clean.

Once the data D' is marked as not dirty, it is then considered in the read cache 18a, b only and may then be erased from the write caches 20a, b if the read 18a, b, c and write 20a, b, c caches are separate memory locations. With the destage logic of FIGS. 6a, b, 7 the primary, i.e., lock unit controlling adaptors, will always return updated data from their read caches 18a, b, c because the read caches 18a, b, c are always updated during destaging. If one of the controlling adaptors fails, e.g., adaptor 8a, then the surviving adaptor, e.g., adaptor 8b, includes the updated data D' and knows the stripe and blocks to be updated because the surviving adaptor 8b knows the exclusive lock unit granted to the failed adaptor 8a and, thus, the stripe that was locked. The surviving adaptor 8b can complete any updates or destages for the failed adaptor 8a.

In the destage logic of FIGS. 6a, b, 7, two messages are used at the beginning of destage and two after destage is completed. (In the N adaptor case, 2*(N−1) messages are used at the beginning of destage and after destage is completed) For instance, upon receiving the update of the data D', the destaging adaptor 8a would send a message to the remote adaptor 8b indicating the stripes and parity to be updated on disk. The destaging adaptor 8b then waits for a return message from the remote adaptor 8b acknowledging receipt of the message. Then, after the destaging adaptor 8a marks its block as clean, i.e., indicates it was updated in the storage device 10a, b, c, the destaging adaptor 8a sends a message to the remote adaptor 8a indicating that the data has been marked as clean. In this way, the remote adaptor 8a knows which parity groups were being updated on the storage devices 10a, b, c at the time of failure. These extra messages allow the remote adaptor 8b to perform fast recovery from failure of the destaging adaptor 8a, as the exact identity of the stripes to be recovered is known to the surviving adaptor.

Conclusion

This concludes the description of the preferred embodiments of the invention. The following describes some alternative embodiments for accomplishing the present invention.

In preferred embodiments, adaptors 8a, b, c interface the nodes 4a, b, c to allow sharing of storage resources. The adaptors 8a, b, c were described as having specific components, such as a processor 14a, b, c, NVRAM 16a, b, c, read cache 18a, b, c, write cache 20a, b, c, and battery 22 to make the write cache 20a, b, c non-volatile. In alternative embodiments, some or all the components of the adaptors 8a, b, c may be located elsewhere in the node 4a, b, c or share resources with the computer 6a, b, c. In yet further embodiments, there may be a central computing resource or node that monitors or controls intercommunication between the nodes 4a, b, c.

The write cache 20a, b, c and read cache 18a, b, c may be memory locations within a single memory device or memory locations within separate memory devices, comprised of any suitable memory device known in the art, including volatile and non-volatile memory devices.

The logic of FIGS. 4–7 is for illustrative purposes. Additional or alternative steps may be performed in addition to those illustrated in the logic. Further, the order of the steps in the preferred logic may also vary. Still further, in preferred embodiments, all adaptors 8a, b, c in the network 12 would have the capability of implementing any of the above described logic, depending upon whether an adaptor 8a, b, c is the updating adaptor, destaging adaptor or remote adaptor in a given case.

In summary, preferred embodiments in accordance with the present invention disclose a system for updating and destaging a data block in a storage device. A first processing unit receives an update to a data block in a storage device. The first processing unit sends a first message including the update and information indicating data blocks that were recently updated to a second processing unit. The second processing unit stores the update in a second storage area and sends a second message to the first processing unit after receiving the first message. The first processing unit stores the update in a first storage area and transfers the update from the first storage area to the data block in the storage device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for updating a data block in a storage device, comprising the steps of:
   receiving an update to a data block in a storage device at a first processing unit;
   sending, with the first processing unit, a first message including the update and information indicating data blocks that were recently updated to a second processing unit;
   storing, with the second processing unit, the update in a second storage area;
   sending a second message with the second processing unit to the first processing unit after receiving the first message;
   storing, with the first processing unit, the update in a first storage area, wherein the first and second storage areas maintain a copy of the update to the data block; and
   transferring, with the first processing unit, the update from the first storage area to the data block in the storage device.

2. The method of claim 1, wherein the step of storing the update in the first storage area occurs after receiving the second message.

3. The method of claim 1, further comprising the steps of:
   calculating, with the first processing unit, new parity from the update to the data block; and
   writing, with the first processing unit, the new parity to the data block in the storage device.

4. The method of claim 1, further comprising the step of updating, with the first processing unit, the information indicating data blocks that were recently updated with information on the update to the data block.

5. The method of claim 4, further comprising the step of updating, with the second processing unit, the information indicating data blocks that were recently updated with the information received from the first processing unit and the data block to update.

6. The method of claim 1, further comprising the steps of:
   detecting, with the second processing unit, a failure in the first processing unit;
   determining, with the second processing unit, the data block being updated by the first processing unit when failure occurred from the information received in the first message; and
   updating, with the second processing unit, the data block in the storage device with the update.

7. A method for destaging an update to a data block in a storage device, comprising the steps of:
   receiving the update to the data block at a first processing unit;
   storing, with the first processing unit, the update in a storage area;
   determining whether the first processing unit controls access to the data block in the storage device;
   sending, with the first processing unit, a first message to a second processing unit requesting control of access to the data block from the second processing unit after determining that the first processing unit does not control access to the data block;
   sending, with the first processing unit, a second message to the second processing unit indicating the blocks to be updated in the storage device;
   writing the update to the data block from the storage area to the data block in the storage device; and
   sending a third message, with the first processing unit, to the second processing unit indicating that the data block was updated.

8. The method of claim 7, wherein the storage area is a first storage area, further comprising the steps of:
   transferring, with the first processing unit, a copy of the update to the data block to the second processing unit before determining whether the first processing unit controls access to the data block in the storage device;
   storing, with the second processing unit, the update to the data block in a second storage area; and
   indicating, with the second processing unit, that the update stored in the second storage area was updated to the data block in the storage device after receiving the third message.

9. The method of claim 8, further comprising the steps of:
   sending, with the second processing unit, a fourth message to the first processing unit in response to receiving the second message;
   sending, with the second processing unit, a fifth message to the first processing unit after indicating that the updated data was written to the data block in the storage device; and
   indicating, with the first processing unit, that the updated data stored in the first storage area was written to the data block in the storage device after receiving the fifth message.

10. A system for updating a data block, comprising:
   (a) a storage device;
   (b) a first processing unit;
   (c) a second processing unit;
   (d) a first storage area accessible to the first processing unit;
   (e) a second storage area accessible to the second processing unit;
   (f) a network communication line providing data communication among the storage device, the first processing unit, and the second processing unit;
   (g) program logic means implemented in the first processing unit, including:
     (i) means for receiving an update to a data block in a storage device at a first processing unit;
     (ii) means for sending a first message including the update to the data block and information indicating data blocks that were recently updated to the second processing unit;
     (iii) means for storing the update in a first storage area; and
     (iv) means for transferring the update from the first storage area to the data block in the storage device; and
   (h) program logic means implemented in the second processing unit, including:
     (i) means for storing the update and location information in the second storage area; and (ii) means for sending a second message to the first processing unit after receiving the first message.

11. The system of claim 10, wherein the means for storing the update in the first storage area stores the update after receiving the second message.

12. The system of claim 10, wherein the program logic implemented in the first processing unit further includes:
   means for calculating new parity from the update to the data block; and
   means for writing the new parity to the data block in the storage device.

13. The system of claim 10, wherein the program logic implemented in the first processing unit further comprises means for updating the information indicating data blocks that were recently updated with information on the update to the data block.

14. The system of claim 10, wherein the program logic implemented in the second processing unit further comprises means for updating the information indicating data blocks that were recently updated with information on the update to the data block.

15. A system for destaging an update to a data block, comprising:
   (a) a storage device;
   (b) a first processing unit;
   (c) a second processing unit;
   (d) a storage area accessible to the first processing unit;
   (e) a network communication line providing data communication among the storage device, the first processing unit, and the second processing unit;
   (f) program logic means implemented in the first processing unit, including:
      (i) means for receiving the update to the data block;
      (ii) means for storing the update in the storage area;
      (iii) means for determining whether the first processing unit controls access to the data block in the storage device;
      (iv) means for sending a first message to the second processing unit requesting control of access to the data block from the second processing unit after determining that the first processing unit does not control access to the data block;
      (v) means for sending a second message to the second processing unit indicating the blocks to be updated in the storage device; and
      (vi) means for writing the update to the data block from the storage area to the data block in the storage device; and
   (g) program logic implemented in the second processing unit, including means for sending a third message to the second processing unit indicating that the data block was updated.

16. The system of claim 15, wherein the storage area is a first storage area, wherein the program logic implemented in the first processing unit further includes means for transferring a copy of the update to the data block to the second processing unit before determining whether the first processing unit controls access to the data block in the storage device; and
   wherein the program logic implemented in the first processing unit further includes means for storing the update to the data block in a second storage area and means for indicating that the update stored in the second storage area was updated to the data block in the storage device after receiving the third message.

17. The system of claim 16, wherein the program logic implemented in the second processing unit further includes means for sending a fourth message to the first processing unit in response to receiving the second message and means for sending a fifth message to the first processing unit after indicating that the update data was written to the data block in the storage device; and wherein the program logic implemented in the first processing unit further includes means for indicating that the update stored in the first storage area was written to the data block in the storage device after receiving the fifth message.

18. An article of manufacture for use in programming a first and second processing units in a shared disk system, the article of manufacture comprising computer readable storage media within the first and second processing units, wherein the computer readable storage media has at least one computer program embedded therein that causes the first and second processing units to perform the steps of:
   receiving an update to a data block in a storage device at the first processing unit;
   sending with the first processing unit a first message including the update and information indicating data blocks that were recently updated to the second processing unit;
   storing with the second processing unit the update and location information in a second storage area;
   sending a second message with the second processing unit to the first processing unit after receiving the first message;
   storing, with the first processing unit, the update in a first storage area; and
   transferring, with the first processing unit, the update from the first storage area to the data block in the storage device.

19. The article of manufacture of claim 18, wherein the step of storing the update in the first storage area occurs after receiving the second message.

20. The article of manufacture of claim 18, further causing the first and second processing units to perform the steps of:
   calculating, with the first processing unit, new parity from the update to the data block; and
   writing, with the first processing unit, the new parity to the data block in the storage device.

21. The article of manufacture of claim 18, further causing the first processing unit to perform the step of updating the information indicating data blocks that were recently updated with information on the update to the data block.

22. The article of manufacture of claim 21, further causing the second processing unit to perform the step of updating the information indicating data blocks that were recently updated with the information received from the first processing unit and the data block to update.

23. The article of manufacture of claim 18, further causing the second processing unit to perform the steps of:
   detecting a failure in the first processing unit;
   determining the data block being updated by the first processing unit when failure occurred from the information received in the first message; and
   updating the data block in the storage device with the update.

24. An article of manufacture for use in programming a first and second processing units in a shared disk system, the article of manufacture comprising computer readable storage media within the first and second processing units, wherein the computer readable storage media has at least one computer program embedded therein that causes the first and second processing units to perform the steps of:

receiving the update to the data block at a first processing unit;

storing, with the first processing unit, the update in a storage area;

determining whether the first processing unit controls access to the data block in the storage device;

sending, with the first processing unit, a first message to a second processing unit requesting control of access to the data block from the second processing unit after determining that the first processing unit does not control access to the data block;

sending, with the first processing unit, a second message to the second processing unit indicating the blocks to be updated in the storage device after determining that the first processing unit does control access to the data block;

writing the update to the data block from the storage area to the data block in the storage device; and sending a third message, with the first processing unit, to the second processing unit indicating that the data block was updated.

25. The article of manufacture of claim 24, wherein the storage area is a first storage area, further causing the first and second processing units to perform the steps of:

transferring, with the first processing unit, a copy of the update to the data block to the second processing unit before determining whether the first processing unit controls access to the data block in the storage device;

storing, with the second processing unit, the update to the data block in a second storage area; and indicating, with the second processing unit, that the update stored in the second storage area was updated to the data block in the storage device after receiving the third message.

26. The article of manufacture of claim 24, further causing the first and second processing units to perform the steps of:

sending, with the second processing unit, a fourth message to the first processing unit in response to receiving the second message;

sending, with the second processing unit, a fifth message to the first processing unit after indicating that the updated data was written to the data block in the storage device; and indicating, with the first processing unit, that the update stored in the first storage area was written to the data block in the storage device after receiving the fifth message.

* * * * *